(12) United States Patent
McGarry et al.

(10) Patent No.: US 6,438,295 B1
(45) Date of Patent: Aug. 20, 2002

(54) ADAPTIVE OPTICAL WAVEGUIDE ROUTER

(75) Inventors: Steven P. McGarry, Carp; Charles D. MacPherson, Ottawa, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/412,437

(22) Filed: Oct. 5, 1999

(51) Int. Cl.[7] .................................................. G02B 6/26
(52) U.S. Cl. ................................ 385/39; 385/2; 385/8; 385/16; 385/31; 385/132
(58) Field of Search ............................. 385/39, 2, 8, 15, 385/16, 31, 130–132, 140

(56) References Cited

U.S. PATENT DOCUMENTS 5,136,669 A * 8/1992 Gerdt ........................... 385/39

* cited by examiner

Primary Examiner—Cassandra Spyrou
Assistant Examiner—Fayez Assaf

(57) ABSTRACT

An adaptive optical waveguide router in which routing paths may be dynamically created by the use of a scanning system. The optical router interconnects at least one optical input to a at least optical output. The optical waveguide layer employed is substantially comprised of a photosensitive material which has a change in index of refraction at one optical wavelength when exposed to a different optical wavelength and which, in some way, may be restored to it's original state. One such material is Bacteriorhodopsin which shows a photocycle in the visible region of the optical spectrum. The scanning system, in response to routing information, traces a routing path(s) between an input(s) and a selected output(s) which alters the index of refraction in the path(s) traced in the photorefractive material. An optical input signal then propagates along the traced path between the selected input(s) and the selected output(s).

26 Claims, 5 Drawing Sheets

ADAPTIVE OPTICAL WAVEGUIDE ROUTER

FIELD OF THE INVENTION

The present invention relates to apparatus and methods for defining optical signal paths in a photosensitive material. In one aspect, the present invention relates to an optical waveguide router that may be dynamically adapted by the use of a scanning system.

BACKGROUND TO THE INVENTION

Routers are known in the art. A router is a device which routes and interconnects one, or many, network inputs to one or many network outputs through a variety of techniques. Optical routers are used to route incoming optical signals from one or more network inputs to one or more optical outputs. Optical fibres are typically used to apply and collect optical signals at the input and output ports. Methods known in the art for performing this routing on incoming optical signals include the use of patch panels, mechanical, thermo-optic, electro-optic and opto-electronic switching.

Patch panels have obvious drawbacks including requiring manual effort (i.e. human intervention) to alter the configuration of the patch panel. This manual manipulation to reconfigure the optical routing of signals in a patch panel can be quite time consuming and therefore costly. Moreover, patch panels do not allow for remote configuration of the routing signals.

Mechanical switches use electrical actuators, such as motors or solenoids, to physically move fibres or optical elements to alter to routing of the signal. While remote configuration of such a system is possible, it relies on mechanical translation, which is inherently slow and has limited configuration possibilities.

Devices using thermo-optic switches are remotely reconfigured through the use of materials which have indices of refraction which are temperature dependent. By changing the temperature (e.g. through the use of a dissipative element such as a resistor) the index of refraction of a waveguide can be altered, thereby allowing the construction of a switch to alter the path of an incoming optical signal. However, thermo-optic crosspoints built from such switches have a limited and fixed number of routing paths available since the waveguides are fixed resulting in a limited ability to reconfigure the crosspoint device. Moreover, the response time, that is the time taken to alter the refractive index at the thermo-optic crosspoint, is not sufficiently fast to allow for the deployment of the crosspoint device into a number of applications. Finally, to maintain the desired routing, the thermo-optic crosspoint requires that a waveguide or juncture be maintained at the required temperature otherwise the applied thermal energy will dissipate returning the thermo-optic switch's index of refraction to its original, or initial, value. As such, the thermo-optic crosspoint, in response to power outage will lose all routing connections that existed prior to the outage.

Electro-optic devices operate in a similar manner to the thermo-optic devices, described above, except the change in refractive index is accomplished by the application of an electric field. These devices may be switched quickly with sufficiently large applied fields but are intrinsically sensitive to the polarisation of the incoming light. This polarisation sensitivity makes them unusable or very cumbersome to use in the majority of cases. In addition, these devices require patterned metal electrodes to apply the electric field which complicates the device's manufacture.

An optical router can also be implemented through opto-electronic means by using optical-to-electrical converters followed by an electrical switch/router and then electrical-to-optical converters. Although this method does have advantages in some applications (such as the ability to do signal grooming, etc.) it requires a prohibitive number of components necessary to convert an optical signal into an electrical signal and back again. If wavelength division multiplexing (WDM) is used, the wavelengths must be separated and converted individually (with systems being introduced with up to 128 wavelengths and beyond on a single fiber, this is a severe drawback). Additionally, the optical-to-electrical and electrical-to-optical conversions can induce distortions in the signal which may be difficult or impossible to remove.

Accordingly, it is desired to provide a method and apparatus for the routing of an optical signal that addresses these shortcomings. More particularly, it is sought to provide a method and apparatus for the routing of optical signals which occurs in the optical domain, that can be dynamically reconfigured remotely, is not limited to a fixed number of routing paths and which may have a fast response time enabling wide deployment of the routing method and apparatus.

SUMMARY OF THE INVENTION

The present invention incorporates a photosensitive material, wherein the material changes between a first state and a second state when exposed to one or more particular wavelengths or wavelength bands of electromagnetic radiation. The change in state of the material results in a change of the material's refractive index at a wavelength or wavelengths different from that of the exciting light. This change in the index of refraction can be used to form a waveguide allowing the propagation of an optical signal. The waveguide may be written by exposing the photosensitive material to electromagnetic radiation to change the material's state and hence to route or switch optical signals. Note that, depending upon the material, a plurality of states and/or state changes may be possible.

Photosensitive materials have the property that, when irradiated by electromagnetic radiation, usually in the near visible or visible spectrum, the material will undergo a photochemical reaction, initiated by the photons, changing the material's state. This new state may be stable and require a reverse photochemical reaction, normally at a different wavelength, to change the material back to its initial state. Alternatively, the material may be unstable or metastable and decay thermally to the initial, or ground, state after a period of time. Often this thermal intermediate state can also be photochemically driven back to the ground state. The electromagnetic absorption spectrum of the material is altered by this change of state. A photorefractive material is any material, upon exposure to electro-magnetic radiation undergoes any type of process that results in a change in the index of refraction to incident light. One suitable photosensitive material is a photochromic material. The change in spectral absorption, which defines photochromism, is related to changes in the dielectric constant and hence index of refraction through the well known Kramers-Kronig relations.

Where a photochromic material is used, the change in spectral absorption directly allows for the construction of an optical attenuator.

In general, a material which reacts to light, be it photochromic, photorefractive, phototropic, etc., is referred to as being photosensitive.

The preferred embodiment incorporates a photosensitive material, such as Bacteriorhodopsin (bR), in the waveguide layer. When bR is illuminated with a radiation source of a first wavelength, it moves from a ground state, having an initial index of refraction to an active state exhibiting an altered index of refraction. Thus, a waveguide layer containing bR (or similar material) may be used to route optical signals in the plane of the layer. Portions of the waveguide layer illuminated by a radiation source of a first wavelength by, for example, a laser beam which traces a path on the waveguide layer or by a light source coupled with a mask, will exhibit an altered index of refraction different than that of the surrounding, non-reacted, material. In the case of bR, the index of refraction in the active state will be increased for writing wavelengths shorter than the ground state absorption peak. As such, a routing path can be created which exhibits properties similar to that of an optical fibre (that is an interior core of high index of refraction material—in this case containing bR in its active state—than the surrounding cladding—in this case containing bR in its ground state). An optical signal received at an input port can then propagate through this routing path formed of reacted bR to a selected output port. Alternatively, if longer wavelengths need to be routed, the outside of the core can be delineated by suppressing the index of refraction in these areas using the same methods as above since, for wavelengths longer than the ground state absorption peak, the index of refraction of bR is reduced in the active state. This would be the case for wild type (WT) and current mutant forms of bR when applied to the optical transmission bands at 1310 nm and 1550 nm. (See diagram 33.3 I in the *CRC Handbook of Organic Photochemistry and Photobiology*, CRC Press, 1995, the contents of said Handbook hereby incorporated herein by reference). The routing path created by illuminating a portion of the waveguide layer can be erased by illuminating at least the previously exposed areas by a second wavelength of radiation which causes the photochromic material to undergo the reverse photochemical reaction. In the case of bR the photochemical reaction is photoisomerization.

In one aspect of the invention there is provided an optical router. The optical router includes a waveguide layer, at least one optical input coupled to the waveguide layer and at least one optical output connected to the waveguide layer. The waveguide layer includes a photosensitive material which has one index of refraction for an optical signal in a first state and a different index of refraction in a second state. The optical router further includes a route writing system emitting radiation to initiate a forward photosensitive reaction in the photosensitive material between the at least one optical input and the at least one optical output, so as to form a waveguide in the waveguide layer.

In another aspect of the invention there is provided an optical router. The optical router includes a waveguide layer, at least one optical input coupled to the waveguide layer and at least one optical output connected to the waveguide layer. The waveguide layer includes a photosensitive material which has one index of refraction for an optical signal in a first state and a different index of refraction in a second state. The optical router further includes a route writing system emitting radiation to initiate a forward photosensitive reaction in the photosensitive material between at least one optical input and at least one optical output, so as to form a waveguide in the waveguide layer, where the photosensitive reaction in the photosensitive material provides lateral optical confinement along a path in the waveguide layer between at least one of the at least one optical input and at least one of the at least one optical output.

In a still further aspect of the invention there is provided an optical router. The optical router includes a waveguide layer incorporating a photo refractive material, and a scanner for irradiating portions of the waveguide layer to change the index of refraction of the irradiated portions.

In a still further aspect of the invention there is provided an optical router comprising: a waveguide layer incorporating a photorefractive material; a route writing system for irradiating portions of the waveguide layer to change the index of refraction of the irradiated portions to form a waveguide.

An optical switch is another aspect of the invention. The optical switch comprising: an optical input; an optical output connected to the optical input by a photosensitive material; the photosensitive material having a first state with a first index of refraction and a second state with a second index of refraction; and a scanner for initiating the photosensitive reaction in the photosensitive material from the first state to the second state.

In a still further aspect of the invention there is provided a method of routing an optical signal. The method includes writing a routing path in a waveguide layer incorporating a photochromic material by irradiating portions of the waveguide layer to change the index of refraction of the waveguide in the irradiated portions, where the writing comprises tracing a routing path in the waveguide layer by a beam of electromagnetic radiation and transmitting the optical signal through the routing path.

In a still further aspect of the invention there is provided a method of routing an optical signal The method includes initiating a photosensitive reaction, in an interconnect material interconnecting at least one optical input and at least one optical output, from a first state that substantially inhibits an optical signal from propagating from the input to the output to a second state which allows the propagation of the signal from the at least one input to the at least one output, tracing a routing path in the interconnect material between the at least one input and the at least one output wherein only the photosensitive reaction is initiated in substantially only the traced path and transmitting an optical signal through the interconnect material in the second state from the at least one optical input to the at least one optical output.

In a still further aspect of the invention there is provided a method for controlling an optical signal. The method includes initiating a photosensitive reaction in an interconnect material interconnecting at least one optical input and at least one optical output from a first state that substantially inhibits an optical signal from propagating from said at least one input to said at least one output to a second state which allows the propagation of said signal from said at least one input to said at least one output and transmitting an optical signal through said interconnect material.

Employing this device allows for a dynamically reconfigurable routing, attenuating or switching device that does not require a substantial number of components. Moreover, the invention provides a method and apparatus for the routing of an optical signal which occurs in the optical domain, can be dynamically reconfigured remotely, is not limited to a fixed number of routing paths and which may have a fast response time enabling wide deployment of the routing method and apparatus.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood after reference to the following detailed specification read in conjunction with the drawings wherein.

DETAILED DESCRIPTION OF THE PREFERRED EMBODIMENTS

Figure 1:
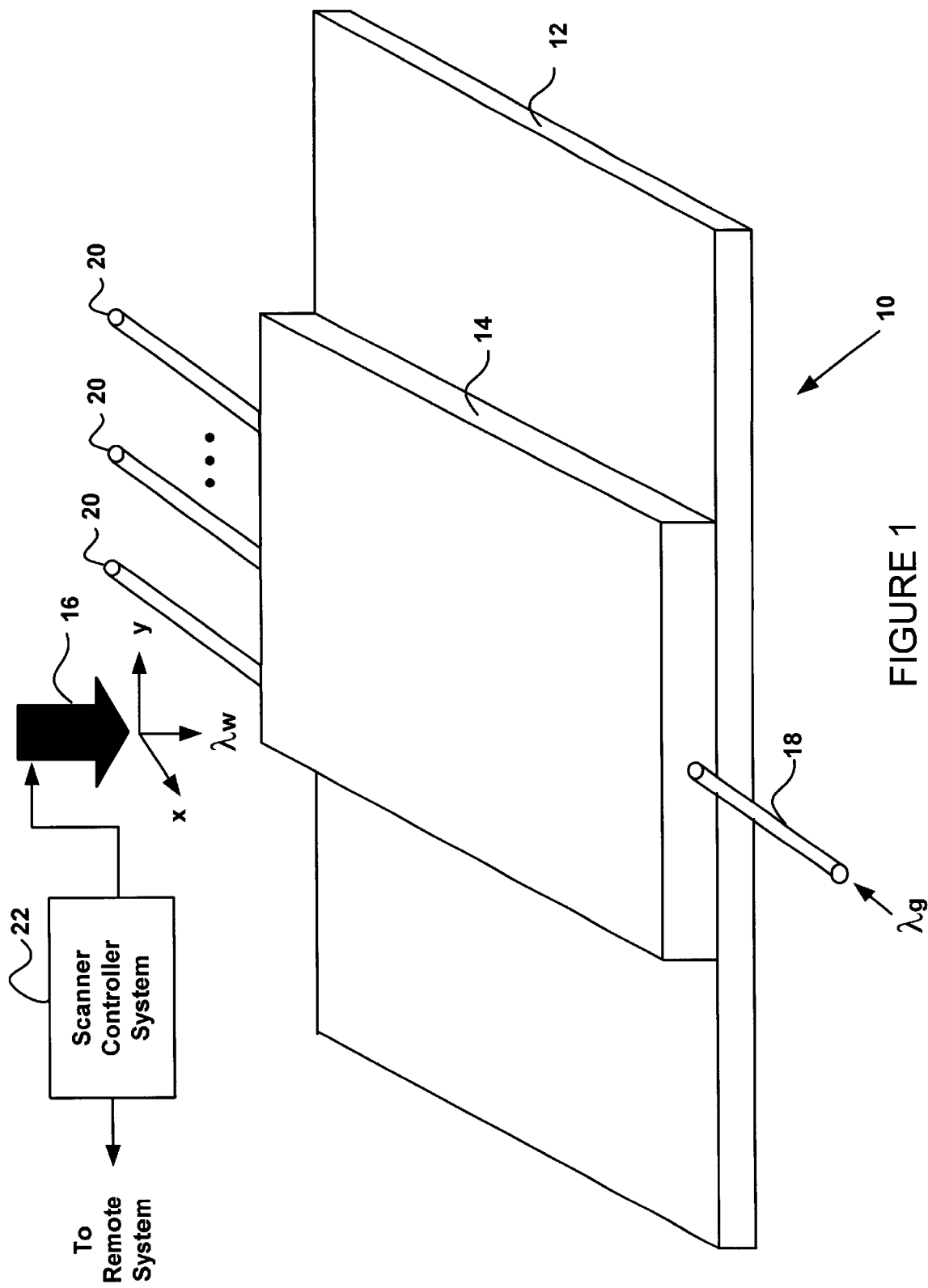
FIG. 1 is perspective view of a schematic of a routing device constructed in accordance with one embodiment of the invention.

Referring to FIG. 1, an adaptive optical waveguide router is generally designated 10. The router consists of a planar substrate 12 made of a dielectric material overlaid with a slab waveguide layer 14. The thickness of layer 14 will depend on the requirements of the waveguide (i.e. single mode, multimode, strongly guided, weakly guided) and the change in the index of refraction that is possible. In order to match the properties of single mode optical fibre, waveguide layer 14 would normally have a thickness of on the order of 10 microns. Access to waveguide layer 14 is accomplished by edge-coupling input optical fibres 18 and output optical fibres 20 to waveguide layer 14 or by coupling the fibres by any other standard method (e.g. grating, prism, etc.). Located over waveguide layer 14 is a route writing system comprising scanner 16 which can irradiate a portion of waveguide layer 14 with a beam of electromagnetic radiation of a desired wavelength. Scanner 16 is directed and controlled by scanning controller 22. Scanning controller 22 is in communication with, and may receive routing information from, a routing information source (not shown). The routing information received by controller 22 is used to direct the irradiation of waveguide layer 14 by scanner 16 thereby dynamically "tracing" and, as is explained later, creating a desired routing path from one, or many, optical inputs 18 to one, or many, of optical outputs 20. The scanning mechanism used can be any of those available such as galvanic mirrors, rotating mirrors, acousto-optic deflectors, etc. and can be either vector scanned to trace out the guides or rastered over the waveguide layer 14.

In one embodiment, controller 22 receives routing information directly from an optical input signal of wavelength $\lambda_g$. Controller 22, in this embodiment, is not required to be in communication with an outside system for providing routing information. Regardless of whether controller 22 is in communication with an outside system, adaptive router 10 has its routing paths dynamically altered by the operation of scanner 16 under the direction of controller 22.

Optical waveguide layer 14 is photosensitive at wavelength $\lambda_w$, in a way which changes the refractive index of waveguide layer 14 at the guided wavelength $\lambda_g$, (i.e., the wavelength of light being routed through waveguide layer 14) for a period of time $\tau_{10}$ (the "guide period") after illumination. Scanner 16 is used to directly "write", or trace, routing paths in the waveguide layer 14 using a beam of radiation of wavelength $\lambda_w$, applied approximately perpendicular to the substrate 12 so as to project a spot on waveguide layer 14, which spot is of suitable size. To accomplish the writing of routing paths in waveguide layer 14 the spot size and position of the beam from the scanner is dynamically controlled by controller 22. The transformation of waveguide layer 14 from a first state, with a first refractive index, to a second state, with a second refractive index, and back to the first state is one complete photocycle.

In an alternative embodiment, the scanner may be replaced by another route writing system such as a light source and a mask. The mask may either be dynamically configurable or may be static. In this alternative embodiment, the light source would flood the mask with the required energy at a suitable wavelength ($\lambda_w$) and the mask would block the irradiation of the waveguide layer 14 by the light source except in the areas required to create a routing path (or a plurality of routing paths). One possible dynamically controlled mask could comprise a Liquid Crystal Light Valve (LCLV). For the case of static masks, a mechanism may be employed to switch between a plurality of masks. This may be accomplished with a mask close to the surface (commonly referred to as a "contact mask") or imaged on the surface using a suitable optical lens system (commonly referred to as a "projection mask").

Since the refractive index of waveguide layer 14 can be altered by scanner 16, but only for a period $\tau_{10}$, waveguide layer 14 must be refreshed at rate greater than $\tau_{10}^{-1}$ by scanner 16 to maintain the current routing configuration until the routing path is to be changed or is no longer required. An alternative embodiment of router 10, which does not require that the routing path in waveguide layer 14 to be refreshed, can be constructed using a photosensitive material with a substantially infinite period $\tau_{10}$ (i.e., the waveguide needs only be "written" once) together with the use a second erasing wavelength, $\lambda_e$, to change (i.e., "erase") the current configuration. In this alternative embodiment, waveguide layer 14 can be erased by use of scanner 16 (or a second scanning system—not shown) emitting a second beam of wavelength $\lambda_e$ or, alternatively, the waveguide layer 14 could simply be flooded by light of wavelength $\lambda_e$. In either embodiment, once waveguide layer 14 is erased a new routing path can then be "written", or traced, by scanner 16 tracing a path in waveguide layer 14 with an emitted beam of wavelength $\lambda_w$. It should be noted that the term "waveguide layer" is used designate the portion of a system, such as for example optical waveguide router 10, that incorporates the photosensitive material, such as Bacteriorhodopsin. A "waveguide layer" may be physically formed into many shapes and structures that includes, but is not limited to, layers on a substrate. In contrast, the term "waveguide" is generally used to designate the portion of the waveguide layer that confines an optical signal from an input to a desired output.

It should be noted that to avoid affecting or degrading the routing paths, wavelengths $\lambda_g$, $\lambda_e$, and $\lambda_w$ should be mutually exclusive wavelengths.

The preferred embodiment of optical router 10 uses the Bacteriorhodopsin (bR) protein (the properties of Bacteriorhodopsin are discussed more fully in "Protein-Based Optical Computing and Memories" by Birge, Robert R., *Computer*, November, 1992, pp. 56–67, and *CRC Handbook of Organic Photochemistry and Photobiology*, CRC Press, 1995 pp. 1563–1586, the contents of both references are hereby incorporated herein by reference) as the photosensitive material in waveguide layer 14. Bacteriorhodopsin is a photochromic material that, when exposed to a specific wavelength or a band of wavelengths of light, will cause an alteration of the material's index of refraction. A photochromic material is a material which, when irradiated by electromagnetic radiation, usually in the near visible or visible spectrum, will undergo a photochemical reaction. Moreover, this photochemical reaction is reversible. That is, the material can revert back to its original state. The bR is dispersed in a material of low optical loss to form the waveguide layer 14 having appropriate physical properties. This material can be organic in nature such as a polymer matrix in which the bR proteins can form a guest-host system or be chemically bonded to the chains. It is also possible to use an inorganic matrix such as a sol-gel. Other materials may be used in addition to bR to modify bR's natural properties, that is, bR may be but one ingredient that forms waveguide layer 14. However, the other materials present in the carrier, which may include, for example, chemical stabilizers, are, generally, present for non-photosensitive purposes. The amount of bR present in layer 14 is determined by the required change in the refractive index to form the guide and is limited by such things as acceptable optical loss and the tendency of unrestrained bR proteins to crystallise.

Referring to FIG. 1, bacteriorhodopsin, as is known in the art, has a number of states. However, in the preferred embodiment, the router 10 takes advantage of Bacteriorhodopsin's initial, or ground state 32 (state 0) which is a green absorbing state and its relatively long-lived blue absorbing state 34 (state M, which is also known as state 1). The ground state 32 (state 0) exhibits a first index of refraction, indicated by the notation "$n_0$". The blue-absorbing state 34 (state 1) exhibits a second index of refraction indicated in FIG. 3 by the notation "$n_1$". As is known in the art, Bacteriorhodopsin can transform states, and is fully stable, in the temperature range of approximately 0° C. to 70° C. However, it will be appreciated by those skilled in the art that through manipulation of the Bacteriorhodopsin protein, the use of chemical stabilizers and other techniques, such as, for example, mutagenesis, it may be possible to increase the operating temperature range, M-state lifetime and other characteristic properties of the Bacteriorhodopsin protein. The matrix bearing the protein, or other photosensitive material, can also have a significant affect on the waveguide layer's properties.

Figure 2A:
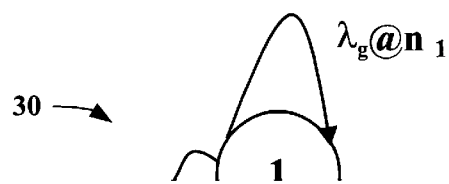
FIG. 2A cross-sectional view of the routing device of FIG. 1 in a first configuration.
Figure 2A:
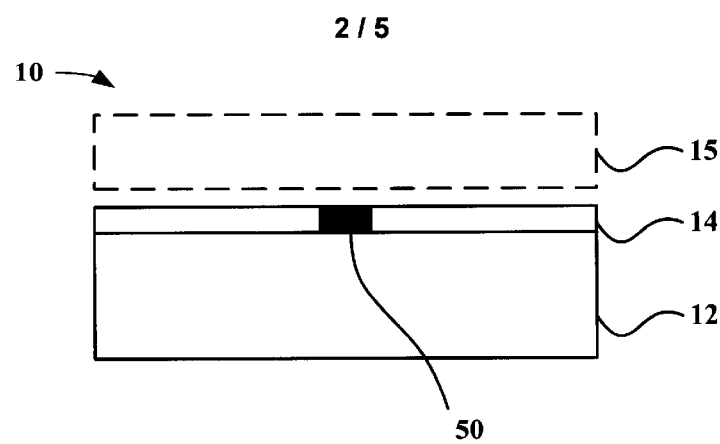
Figure 2B:
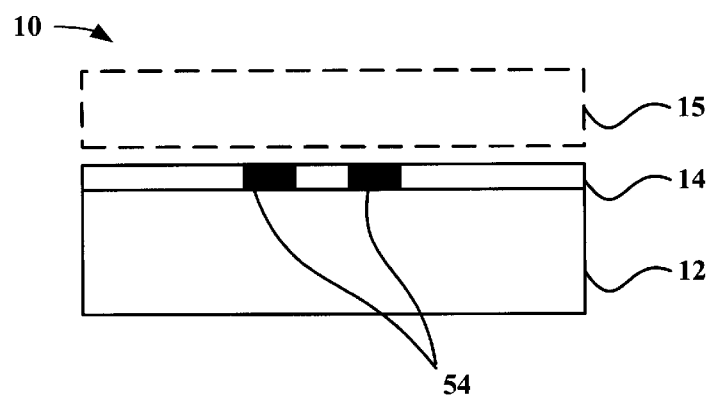
FIG. 2B cross-sectional view of the routing device of FIG. 1 in a second configuration.
Figure 5:
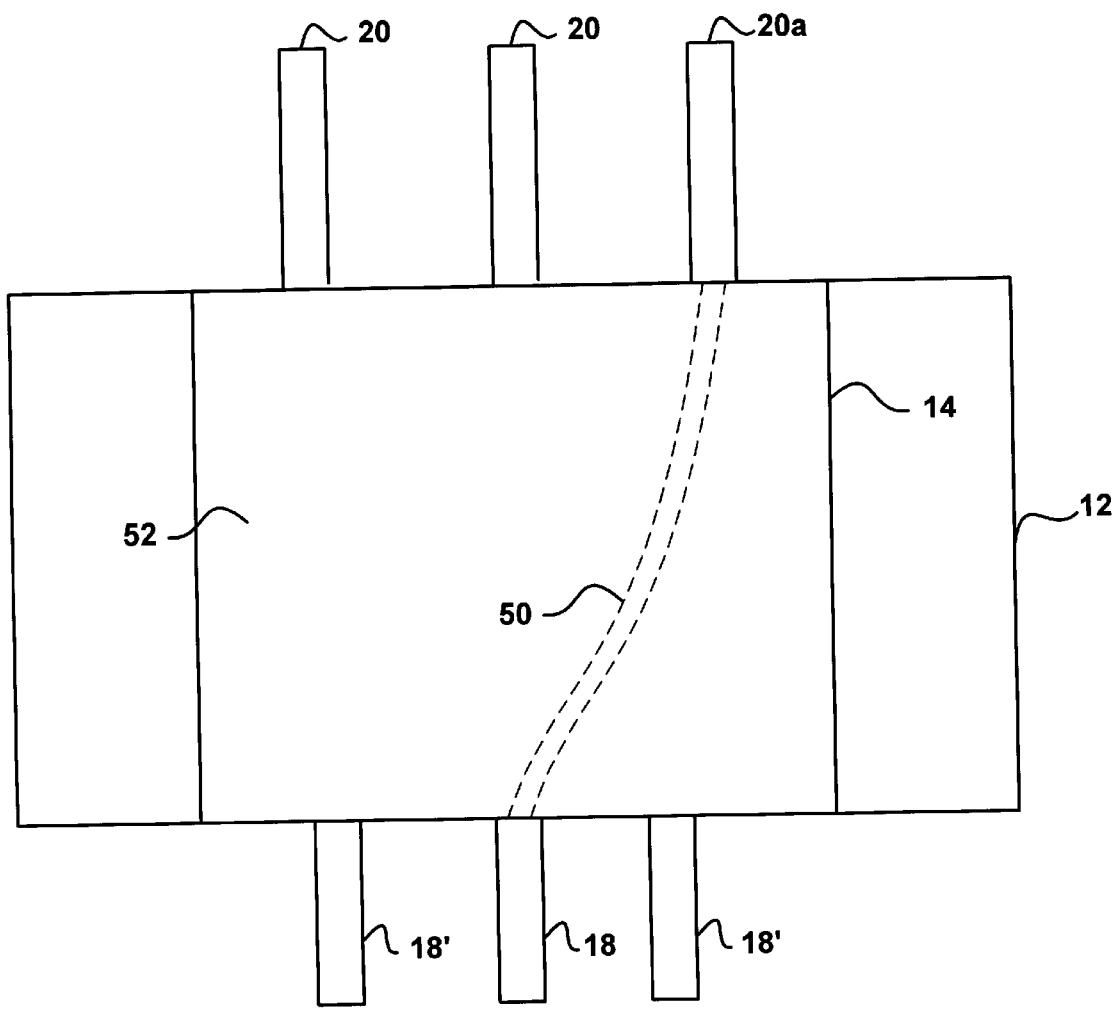
FIG. 5 is a plan elevation schematic of the device of FIG. 2A.

With respect to Bacteriorhodopsin in waveguide layer 14, Bacteriorhodopsin will, when targeted and illuminated by a light beam emitted from scanner 16 with a wavelength of approximately 570 nm ($\lambda_w$), undergo a photochemical cycle causing Bacteriorhodopsin to shift from the ground state 32 (state 0) to the active state 34 (state M) (the "forward" photochromic or photosensitive reaction or effect, identified as transition path 36) through a process known as photoisomerization. That is, the Bacteriorhodopsin in the ground state 32 is an isomer of the Bacteriorhodopsin in its active state 34 (state M). When in state 34 (state M) the Bacteriorhodopsin protein is characterized by an absorption spectra which is distinct from that in its ground state 32 (state 0). Moreover, Bacteriorhodopsin displays an index of refraction in active state 34 which is different than the index of refraction in Bacteriorhodopsin's ground state 32 (state 0) with the magnitude and sign of this difference dependent on the guided wavelength. Where the guided wavelength is less than writing wavelength (i.e., $\lambda_g < \lambda_w$) Bacteriorhodopsin will display an index of refraction greater in its active state 34 (state M) than its ground state 32 (state 0). In such an instance, the routing path 50 formed in waveguide layer 14, and illustrated in FIGS. 2A and 5, is formed and defined by the active bR. However, if the guided wavelength is greater than writing wavelength ($\lambda_w$) (i.e., $\lambda_g > \lambda_w$) Bacteriorhodopsin will display an index of refraction in its active state 34 (state M) that is lower than in its ground state 32 (state 0). In such an instance, the routing path 50 formed in waveguide layer 14, illustrated in FIG. 2B, is bounded by active bR 54, which has a lower index of refraction than the bR in ground state 32, which forms routing path 50. That is, in either configuration of the bR, either forming the core or the cladding when in its active state, the active and non-active bR form a lateral optical confinement path for the incident light to be routed.

Bacteriorhodopsin extracted from the wild type (WT) of the bacteria has a guide period, $\tau_{10}$, of approximately 10 ms after which the protein will naturally return to its ground state 32 (identified by transition path 38). Moreover, if desired, Bacteriorhodopsin can be forced to revert to its ground state earlier than would naturally occur. By illuminating all, or a portion, of the Bacteriorhodopsin waveguide layer 14 with light of wavelength $\lambda_e$=410 nm the Bacteriorhodopsin be photochemically driven back from its active state 34 (state M) to its ground state 32 (state 0) (this is known as the "reverse" photochromic or photosensitive reaction, and is identified by transition path 40). As noted above, the alteration of the Bacteriorhodopsin protein, through a variety of techniques, can alter its properties, including its guide period. It has been shown that the guide period of Bacteriorhodopsin can be increased by several orders of magnitude.

A guide period of approximately 10 ms is sufficient to enable routing paths to be maintained during brief incidences of loss of power. However, an alternative embodiment of the invention would use a photosensitive material with a guide period ($\tau_{10}$) that is much longer, or substantially infinite. For example, a mutant form (D96N) of bR has been formed by mutagenesis of the bacteria with a M-state spontaneous decay lifetime of up to 100 seconds (i.e., $\tau_{10}$=100 s). There are many other mutations possible and environmental conditions, such as, for example, the pH, which can be adjusted to further increase lifetime. A substantially infinite guide period enables the routing connections to be maintained during most, if not all, incidences of loss of power. When power is restored to the system in such an instance, the routing connections would then still be operative thereby reducing the time required for a complete system recovery.

Optionally, waveguide router 10 may include upper cladding layer 15, shown in phantom in FIGS. 2A and 2B. Upper cladding layer 15, which is not required, may further tailor the optical mode characteristics of the waveguide layer 14.

Other candidate photosensitive materials could be substituted for the Bacteriorhodopsin of waveguide layer 14 and may include, for example, visual rhodopsin, chloroplast and photosynthetic reaction centres as well as other organic materials having at least two states. Suitable materials should have distinct photocycles that are initiated by using one or more wavelengths of radiation. Any material in which: the dielectric constant (or, equivalently, the index of refraction) at the wavelength to be guided ($\lambda_g$) can be significantly altered by illumination at another wavelength ($\lambda_w$); guided light at $\lambda_g$ does not significantly alter the properties of the material; and has a decay time constant which is large (or at least larger) than the time to rewrite or refresh the guide configuration is a possible candidate as an active material in this invention. Optionally, it may be possible that another wavelength ($\lambda_e$) can be used to actively erase the guides. Many materials, including organic and inorganic materials, displaying desirable characteristics may be employed. Some materials which are known to display photochromic properties, but have not been tested in an embodiment of the invention, include certain dyes, stereoisomers, polynuclear aromatic hydrocarbons, HgCNS, HgI$_2$, Li$_3$N, TiO$_2$, ZnS, alkaline earth sulfides, titanates, silver-halide glasses, and others. Several photochromic materials are described in *Smart Windows Switch on the Light,* in IEEE Circuits and Devices, March, 1992, the contents of which are hereby incorporated herein.

Figure 4:
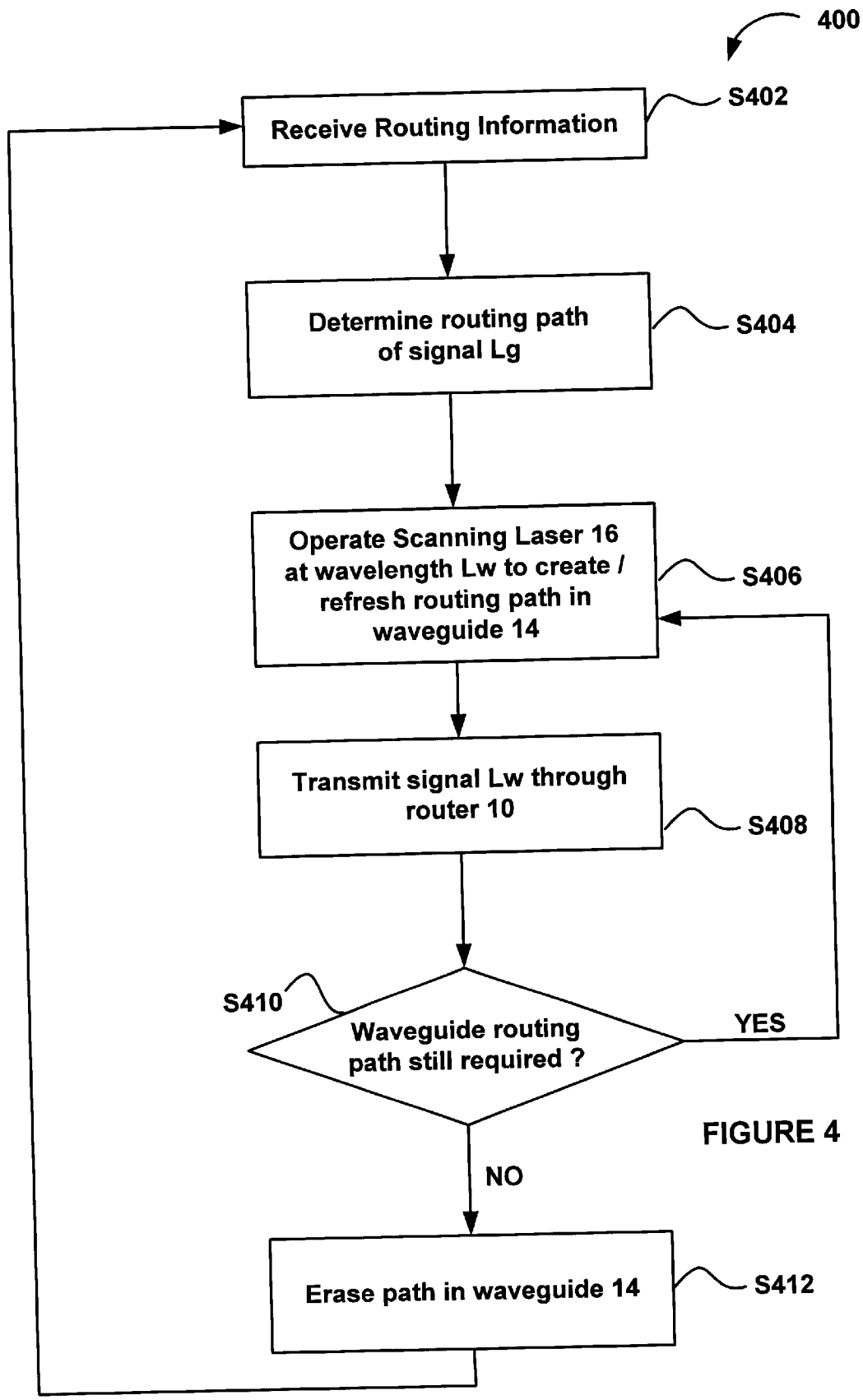
FIG. 4 is a flow chart illustrating the operation of the device of FIG. 1.

The operation of adaptive optical waveguide router 10 is illustrated in the flowchart of FIG. 4 and is generally referenced as operations 400. Controller 22 receives routing information from an outside system, such as, for example a network configuration controller, in step S402. Controller 22 then converts this routing information into a routing path for signal $\lambda_g$ that is required to be established in waveguide layer 14 (step S404). Controller 22 then, in accordance with the instructions received in step S402, operates scanner 16 to emit a beam of light at wavelength $\lambda_w$ illuminating and drawing or tracing a contiguous path on waveguide layer 14 from the input fibre 18 to a selected output fibre 20 thereby creating a routing path (step S406) from optical input 18 to optical output 20 at, for example, time index t=0.

Figure 3:
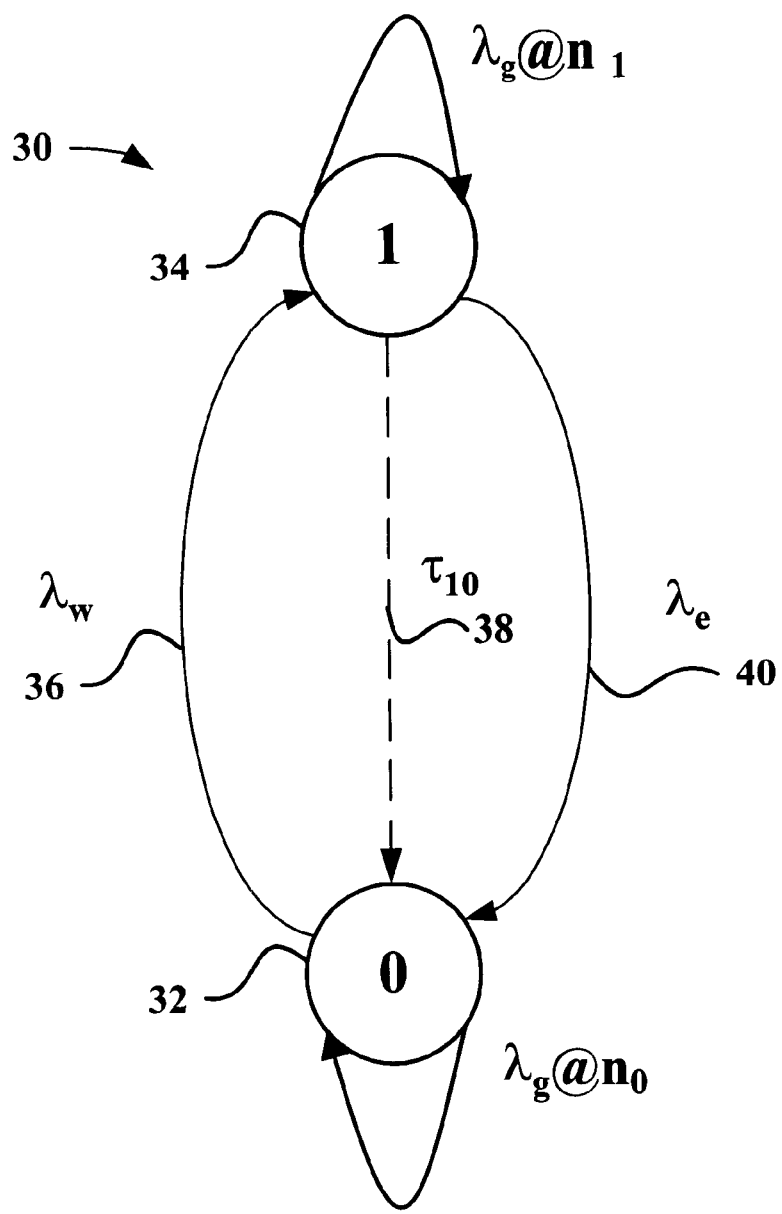
FIG. 3 is a state diagram of a portion of the routing device of FIG. 1.

In step S406, a routing path is created by exciting a contiguous path of Bacteriorhodopsin from its ground state 32 (state 0) to its active state 34 (state M) (FIG. 3). As noted above, when in its active state 34 (state M), Bacteriorhodopsin displays a higher index of refraction than Bacteriorhodopsin in its ground state 32 (state 0) for $\lambda_g<\lambda_w$. Therefore, scanner 16, by illuminating and tracing a path on waveguide layer 14 connecting optical input 18 to a selected optical output 20a (FIG. 5) creates a routing path 50 between two these two points in the waveguide layer which exhibits an index of refraction higher than the surrounding material. This routing path creates an optical fibre-like connection in the waveguide layer 14. Optical fibres, as is well known, have a core which has a higher index of refraction than an outer and surrounding material known as the cladding. Due to the differing indices of refraction between the core and the cladding, an incident ray of light transmitted through an optical fibre will experience almost total internal refraction. This same phenomenon is experienced by a light ray which is transmitted through input 18 into the traced routing path 50 of FIG. 5 formed of active Bacteriorhodopsin creating a contiguous path from optical input 18 to optical output 20a. Since the illuminated and active Bacteriorhodopsin of routing path 50 (FIG. 5) will have a higher index of refraction (like the core of an optical fibre) than the non-active surrounding Bacteriorhodopsin (like the optical fibre cladding) of region 52 (FIG. 5), a signal at $\lambda_g$, transmitted through optical input 18 will be transmitted along routing path 50 to the selected optical output 20a experiencing internal refraction within routing path 50 defined by the active Bacteriorhodopsin (step S408). This traced path, forming a region analogous to the core of an optical fibre is illustrated in cross-section in FIG. 2A. In situations where the signal wavelength, $\lambda_g$, is such that waveguide layer 14 experiences a lower index of refraction in the active state 34 (state M), the cladding, shown as cladding 54 in FIG. 2B, can be written by scanner 16 instead of writing the core 50—which is the configuration illustrated in FIGS. 2A and 5. As will now be apparent, in either situation (i.e., regardless of whether the active bR forms the "core" of the waveguide or the "cladding"), the active and non-active, or ground state, bR together form lateral optical confinement path through which a signal is transmitted. Additional inputs 18' (FIG. 5) into waveguide layer 14 are also illustrated.

If, prior to Bacteriorhodopsin's return from its active state 34 (state M) (i.e., prior to the elapse of $\tau_{10}$ from t=0), it is determined by controller 22 (step S410) that the routing path created in step S406 is still required after the transmission of signal $\lambda_g$ from input 18 to selected output 20, the routing path is refreshed (in the same manner that the path was created) in step S406. If, on the other hand, it is determined by controller 22 (step S410) that the routing path created/refreshed in S406 is no longer required the routing path is "erased" (that is the active Bacteriorhodopsin reverts from its active state 34 (state M) to its ground state 32 (state 0)) in step S412. The routing path can be erased in step S412 in two ways. Firstly, the reversion from active state 34 back to ground state 32 can be allowed to occur naturally without further intervention from controller 22 and scanner 16. That is, after a period of time, $\tau_{10}$, has elapsed since the routing path was last refreshed by scanner 16, it can be assumed that the active Bacteriorhodopsin has naturally reverted to its ground state 32, following transition path 38. However, it may be desirable to "erase" the routing path created in S406 more quickly and prior to the elapse of a period $\tau_{10}$. In such an instance controller 22 directs scanner 16 to emit a beam of wavelength $\lambda_e$ following the routing path created in S406. Due to Bacteriorhodopsin's photochromic properties, the Bacteriorhodopsin is thus photochemically driven back from its active state 34 (state M) to its ground state 32 (state 0) by the emission of wavelength $\lambda_e$, following transition path 40. Operations 400 can then be repeated as is necessary.

As will be obvious to those skilled in the art, adaptive waveguide router 10 may have a plurality of optical fibre inputs. Moreover, each signal transmitted to router 10 through these plurality of inputs will have different routing requirements. As such, controller 22 and scanner 16 are capable of creating, refreshing and, if necessary, erasing, a plurality of routing paths in waveguide layer 14 contemporaneously. In this way it will be obvious to those skilled in the art that optical waveguide router 10 allows for the dynamic routing of optical signals between a theoretically unlimited (although practically limited but still large) number of optical input and output fibres. Having a plurality of inputs and outputs also allows for point-to-multipoint and multipoint-to-point capability. Moreover, it may be desirable to erase all of the plurality of routing paths simultaneously. In such an instance, all routing paths could be erased by flooding (i.e. irradiating the entire waveguide 14 layer) with a beam of wavelength $\lambda_e$. By flooding waveguide layer 14 in its entirely with wavelength $\lambda_e$, all of the Bacteriorhodopsin will be photochemically driven back to its ground state (state 0) thereby erasing all routing paths simultaneously.

At temperatures approaching that of liquid nitrogen (~77K), Bacteriorhodopsin exhibits a stable intermediate state K which also provides a shift in the index of refraction. The period of time for Bacteriorhodopsin to transform from its ground state (state 0) to state K is on the order of 5 picoseconds. This extremely fast response time may be beneficial in a variety of applications such as, for example, high speed switching and routing. Therefore, where a fast response time is critical, it may be theoretically possible, although this has yet to be tested, to exploit this intermediate K state of bacteriorhodopsin in the waveguide by cooling the waveguide layer, as necessary, so that the waveguide router operates with the Bacteriorhodopsin transforming between its ground state and state K.

Router 10 can be adaptive and dynamic and, depending upon the material and recording technique, used for switching at various rates. For switching applications, several properties, in isolation or combination, are desirable. Firstly, a material with a very low guide period (i.e., $\tau_{10}\rightarrow 0$) allows for a quick switch response time (i.e., the material quickly reverts back to its initial state rapidly after exposure to the "writing" wavelength). Second, a material which can be quickly "erased", even if its guide period is relatively long, can also perform switching operations adequately. A further property that is desirable is a quick response time to an exposure to the "writing" light ("$\tau_{01}$", response time to incident light). A low $\tau_{01}$ allows for the system to be turned "on" (that is, the system has had its refractive index altered by the incident "writing" light from its initial, or base, state) more quickly. Materials which react to the incident "writing" wavelength ($\lambda_w$) with a high degree of precision or resolution are also desirable. With these materials, only areas that are specifically targeted and exposed to the scanning system and, specifically, to the light of wavelength $\lambda_g$, react. The greater the area which reacts despite not being directly targeted by the scanning system the lower the material's resolution which could impact the number of possible routes that may be created through waveguide layer 14.

While a routing path has been described and illustrated in the Figures as a routing path in a single plane (i.e., in two dimensions, namely the xy-plane) only, a further embodiment of the invention may include configuring routing paths in three dimensions. It may be possible to configure, or trace, a three dimensional routing path in waveguide 14 (FIG. 1) by initiating the forward photochromic reaction using a two-photon writing system. The requirements for a two-photon writing system are suggested in the *CRC Handbook of Organic Photochemistry and Photobiology*.

A further application of the invention is use as an optical attenuator. As is known by persons skilled in the art, it is often desirable in optical systems to attenuate an optical signal. Adaptive optical waveguide router 10 (FIG. 1) can also be used for this purpose. Routing path 50 (FIG. 5) is illustrated as being in alignment with input fibre 18. However, by altering the alignment of routing path 50 so that there is a small amount of misalignment (that is, a portion of input fibre 18 does not feed into routing path 50 but rather into region 52—FIG. 5), a portion of a signal transmitted on input fibre 18 will be transmitted into region 52 and not routed to an output fibre 20. The misalignment may include a lateral displacement of routing path 50 relative to the input fibre 18 or having some amount of unreacted bacteriorhodopsin interposed between at least a portion of the interface between routing path 50 and input fibre 18. As a result, only a portion the signal transmitted on input fibre 18 will be routed to output 20a, resulting in an attenuation of the input signal. If desired, a similar misalignment of routing path 50 with respect output fibre 20a can achieve the same result. A similar attenuation of the input signal may also be achieved by altering the geometry of routing path 50. As is known in the art, the radius of curvature of an optical fibre will impact the amount of "leakage" in the optical waveguide. Thus, as the radius of curvature decreases (that is, the waveguide is forced into a tighter bend) the amount of signal loss (or leakage) increases. Accordingly, routing path 50 can be traced and formed to incorporate a bend or curve to attenuate a signal that is to be routed from input fibre 18 to output fibre 20. The bend in routing path 50 will be formed in such a way such that the bend's radius of curvature causes a desired amount of leakage thus resulting in an attenuated signal. Attenuation of a routed signal may also be achieved by tracing a routing path 50 that is narrower, in cross-section, than input fibre 18 or, alternatively, wider, in cross-section, than output fibre 20. In the instance where routing path 50 is narrower than input fibre 18, some of the signal transmitted to routing path 50 from input fibre 18 will be transmitted to region 52, resulting in an attenuation of the signal routed along routing path 50. Similarly, an attenuation of a signal transmitted along routing path 50 can also be achieved by forming routing path 50 which is wider than output fibre 20. In this instance, a portion of the routed signal would not be coupled into output fibre 20, thus resulting in an attenuation of the signal. A further method of attenuated a signal to be routed can be achieved by adjusting the guide strength of routing path 50. This may be achieved by incorporating in routing path 50 some small portions of unreacted bacteriorhodopsin. As a result of the unreacted bacteriorhodopsin in routing path 50, a routed signal will be attenuated. Accordingly, a dynamically configurable optical attenuator can be formed from a material having a first index of refraction in a first state and a second index of refraction in a second state by a number of attenuation methods such as, for example, adjusting the alignment of the routing path (i.e. misaligning) relative to the input fibre (or port), adjusting the alignment of the routing path (i.e. misaligning) relative to the output fibre (or port), incorporating specific geometry (e.g., a specific radius of curvature) in the routing path, adjusting the guide strength of the routing path, or adjusting the width of the routing path relative to either the input or output ports.

The system disclosed herein can be used anywhere where switching signals between fibres is desirable or required such as, for example, transport system reconfiguration, protection switching, patch panel elimination, IP packet routing and ATM virtual channel selection. In addition fibre-oriented optical processing, both inter and intra-fibre, is possible through application of the system. Thus, it is possible to use the described writing techniques to write other "optical elements" into the waveguide layer such as grating filters, reflectors, splitters, combiners, etc. Any element which can be formed from a spatial variation in the refractive index within the limits available is possible. This will allow for some on-substrate integrated optical processing, if required (such as for Wavelength Division Multiplexing (WDM)). These additional applications may be formed by advantageously using the photosensitive material of the waveguide system (i.e., the waveguide layer and the scanning system) to transmit a signal in a first state (that is, the waveguide layer enables a desired propagation of, or is transmissive to, an optical signal) and to inhibit propagation of an optical signal in a second state (that is, the waveguide layer substantially prevents an optical signal from propagating (i.e., the waveguide layer is non-transmissive). The non-transmissivity of the waveguide layer may result from one or more of the following physical phenomenon: absorption; dissipation; reflection; spreading of the optical signal; dispersion; or attenuation.

The light in fixed guides could be switched using bR (or similar material) in a cladding layer (rather than in the guiding layer), as follows:

A layer incorporating bR could be used to replace the cladding surrounding of a fixed guide core in an otherwise conventional optical fibre. The ground state index of refraction of the cladding would be lower than that of the fixed guide core, thereby allowing the light to propagate. However, in the active state, the cladding would have an index of refraction equal to or higher than the guide core causing the propagating light to become unguided and be dissipated in the cladding. This method can also be used to transfer energy between two parallel guides. As noted above, the function of the ground and active states may be exchanged.

The different absorption spectra of the ground and active states of a photochromic material, such as bR, can also be used to attenuate or extinguish light travelling in a bR-doped guide. This is possible if the propagating wavelength is absorbed in one state but not the other.

The bR, or other photochromic material, can be engineered to some extent to achieve this result.

The switching is accomplished by irradiating the waveguide layers, or sections thereof, to change the absorption characteristics from transparent to absorbing at the signal wavelength.

The ground state absorption at the guided wavelength is low, thus allowing the light to propagate, while in the active state the material has high absorption and will attenuate the light. Thus a path between the input and output can be established which allows the optical signal to propagate in the "ON" (ground) state. With a path written between the input port and the output port, the optical signal will not propagate. As noted above, the functions of the ground and active states may be exchanged.

These ON-OFF methods of switching provide the ability to switch fixed guides in much the same way as thermo-optic or electro-optic devices without requiring structures to electrically address the individual switches as the case with thermo-optic or electro-optic devices.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

We claim:

1. An optical router comprising:

a waveguide layer;

at least one optical input coupled to said waveguide layer;

at least one optical output connected to said waveguide layer;

said waveguide layer comprising a photosensitive material which has one index of refraction for an optical signal in a first state and a different index of refraction in a second state; and a route writing system emitting radiation to initiate a forward photosensitive reaction in said photosensitive material between said at least one optical input and said at least one optical output, so as to form a waveguide in said waveguide layer.

2. The optical router of claim 1, wherein said photosensitive material being at least one of:

photochromic and photorefractive.

3. The optical router of claim 2, wherein said route writing system initiates said photosensitive reaction only in selected portions of said photosensitive material.

4. An optical router comprising:

a waveguide layer;

at least one optical input coupled to said waveguide layer;

at least one optical output connected to said waveguide layer;

said waveguide layer comprising a photosensitive material which has one index of refraction for an optical signal in. a first state and a different index of refraction in a second state; and a route writing system emitting radiation to initiate a forward photosensitive reaction in said photosensitive material between said at least one optical input and said at least one optical output, so as to form a waveguide in said waveguide layer, where said photosensitive reaction in said photosensitive material provides lateral optical confinement along a path in said waveguide layer between at least one of said at least one optical input and at least one of said at least one optical output.

5. The optical router of claim 4, wherein said route writing system comprises a scanner which traces said path wherein said forward photosensitive reaction is only initiated in said traced path.

6. The optical router of claim 4, wherein said route writing system comprises a scanner which traces a boundary of said path in said waveguide and wherein said forward photosensitive reaction is only initiated in said boundary.

7. The optical router of claim 4, wherein said route writing system further comprises a controller controlling said route writing system.

8. The optical router of claim 7, wherein said route writing system comprises a scanner.

9. The optical router of claim 8, wherein said scanner emits radiation at a first wavelength to initiate said forward photosensitive reaction and emits radiation at a second wavelength to initiate said reverse photosensitive reaction.

10. The optical router of claim 8 wherein said controller is responsive to routing information received from an optical signal input to said router.

11. The optical router of claim 7 wherein said controller is responsive to routing information received from a remote system.

12. The optical router of claim 11 wherein said traced path is determined by said controller in response to said routing information.

13. The optical router of claim 4 wherein said photosensitive material comprises one of Bacteriorhodopsin, visual rhodopsin, chloroplast and photosynthetic reaction centres.

14. A method of routing an optical signal comprising:

initiating a photosensitive reaction, in an interconnect material interconnecting at least one optical input and at least one optical output, from a first state that substantially inhibits an optical signal from propagating from said input to said output to a second state which allows the propagation of said signal from said at least one input to said at least one output;

tracing a routing path in said interconnect material between said at least one input and said at least one output responsive to said received routing information wherein only said photosensitive reaction is initiated in substantially only said traced path; and transmitting an optical signal through said interconnect material in said second state from said at least one optical input to said at least one optical output.

15. The routing method of claim 16 further comprising the step of initiating a reverse photosensitive reaction in said interconnect material in said routing path.

16. The routing method of claim 14 wherein said received routing information is received from one of a remote system and said optical signal prior to routing said signal through said interconnect material.

17. An optical router comprising:

a waveguide layer incorporating a photorefractive material;

a route writing system for irradiating portions of said waveguide layer to change the index of refraction of said irradiated portions to form a waveguide.

18. The optical router of claim 17, further comprising:

a plurality of inputs optically coupled to said waveguide layer; and a plurality of outputs optically coupled to said waveguide layer.

19. The optical router of claim 18, wherein said photorefractive material has a first refractive index at a first state and a second, higher refractive index, at a second state when irradiated by said route writing system.

20. The optical router of claim 19, wherein said photorefractive material is Bacteriorhodopsin.

21. The optical router of claim 20, wherein said route writing system irradiates said portion of said waveguide layer responsive to routing information received from a remote system.

22. An optical router comprising:
   a waveguide layer incorporating a photorefractive material;
   a scanner for irradiating portions of said waveguide layer to change the index of refraction of said irradiated portions.

23. The optical router of claim 22, wherein said scanner is operable to emit two wavelengths of radiation, the first wavelength initiates a transformation from said first state to said second state and said second wavelength initiates a transformation from said second state to said first state.

24. The optical router of claim 23, wherein said route writing system irradiates said portion of said waveguide layer responsive to an optical signal input to said optical router.

25. A method of routing an optical signal comprising:
   writing a routing path in a waveguide layer incorporating a photochromic material by irradiating portions of said waveguide layer to change the index of refraction of said waveguide layer in said irradiated portions, where said writing comprises tracing a routing path in said waveguide layer by a beam of electromagnetic radiation; and
   transmitting said optical signal through said routing path.

26. The method of claim 25 wherein said optical signal is routed from at least one input to said waveguide layer to at least one output of said waveguide layer.

* * * * *

UNITED STATES PATENT AND TRADEMARK OFFICE
CERTIFICATE OF CORRECTION

PATENT NO. : 6,438,295 B1  Page 1 of 1
DATED : August 20, 2002
INVENTOR(S) : McGarry et al.

It is certified that error appears in the above-identified patent and that said Letters Patent is hereby corrected as shown below:

Column 13,
Line 58, delete "in. a first" and insert -- in a first --;

Column 14,
Line 49, delete "method of claim 16" and insert -- method of claim 14 --;

Signed and Sealed this

Tenth Day of August, 2004

JON W. DUDAS
*Acting Director of the United States Patent and Trademark Office*